(12) United States Patent
Weidmann et al.

(10) Patent No.: US 8,234,793 B2
(45) Date of Patent: Aug. 7, 2012

(54) ARRANGEMENT WITH A SCALE FASTENED ON A SUPPORT

(75) Inventors: Josef Weidmann, Altenmarkt (DE); Peter Speckbacher, Kirchweidach (DE)

(73) Assignee: Dr. Johannes Heidenhain GmbH, Traunreut (DE)

( * ) Notice: Subject to any disclaimer, the term of this patent is extended or adjusted under 35 U.S.C. 154(b) by 33 days.

(21) Appl. No.: 12/927,488

(22) Filed: Nov. 16, 2010

(65) Prior Publication Data

US 2011/0119945 A1     May 26, 2011

(30) Foreign Application Priority Data

Nov. 25, 2009   (DE) .................. 10 2009 047 120

(51) Int. Cl.
*G01D 5/347* (2006.01)
*G01D 5/00* (2006.01)
*G01D 13/02* (2006.01)
(52) U.S. Cl. .......................... 33/707; 33/706
(58) Field of Classification Search ............ 33/701, 33/702, 706, 707, 708; 356/616, 617, 618, 356/620
See application file for complete search history.

(56) References Cited

U.S. PATENT DOCUMENTS

| | | | |
|---|---|---|---|
| 4,777,728 A | | 10/1988 | Ludicke |
| 5,655,311 A | * | 8/1997 | Affa ............................ 33/706 |
| 5,778,553 A | * | 7/1998 | Hollensbe ................... 33/810 |
| 6,964,113 B2 | * | 11/2005 | Bridges et al. .............. 33/702 |
| 7,707,739 B2 | | 5/2010 | Holzapfel et al. |
| 7,765,711 B2 | * | 8/2010 | Schneeberger et al. ...... 33/706 |
| 8,051,575 B2 | * | 11/2011 | Bridges et al. .............. 33/502 |
| 2002/0148133 A1 | * | 10/2002 | Bridges et al. .............. 33/702 |
| 2007/0137059 A1 | | 6/2007 | Holzapfel et al. |
| 2011/0119945 A1 | * | 5/2011 | Weidmann et al. .......... 33/707 |
| 2012/0023769 A1 | * | 2/2012 | Speckbacher et al. ....... 33/707 |

FOREIGN PATENT DOCUMENTS

| | | |
|---|---|---|
| EP | 0 264 801 B1 | 12/1989 |
| EP | 1 783 463 A1 | 5/2007 |

* cited by examiner

*Primary Examiner* — Yaritza Guadalupe-McCall
(74) *Attorney, Agent, or Firm* — Brinks, Hofer, Gilson & Lione

(57) ABSTRACT

An arrangement for a scale, the arrangement including a scale having a measurement graduation that defines a measurement range and a support arranged opposite to the measurement graduation. The arrangement further includes spheres two-dimensionally distributed on the support, wherein the spheres are immovably fixed on the support and to the scale.

18 Claims, 4 Drawing Sheets

ARRANGEMENT WITH A SCALE FASTENED ON A SUPPORT

RELATED APPLICATIONS

Applicants claim, under 35 U.S.C. §119, the benefit of priority of the filing date of Nov. 25, 2009 of a German patent application, copy attached, Serial Number 10 2009 047 120.0, filed on the aforementioned date, the entire contents of which is incorporated herein by reference.

BACKGROUND

1. Technical Field

The present invention relates to an arrangement with a scale fastened on a support.

2. Background Information

For measuring the relative position of two machine elements, it is required to fasten a scale on one of the machine elements, and fasten a scanning unit on the other one of the machine elements, which can be moved relative to each other. During position measurement, a measuring graduation of the scale is scanned by a scanning unit and position-dependent scanning signals are generated.

In accordance with EP 0 264 801 B1, a scale is mounted on a support and is supported on spheres. The spheres are seated so that they can roll within small ranges. A holding force between the scale and the support is introduced by springs.

By combination of the sphere and spring, fastening and support is only possible in the edge area of the scale, because no planar seating can be achieved within the actual measuring range of the scale.

Scale fastening by optical contact is explained in EP 1 783 463 A1. The contact surface in EP 1 783 463 A1 is divided into a plurality of small contact faces that are spaced apart from each other. The contact faces are embodied in the form of one-piece elements on the scale or on the support. Although secure fastening and a relatively even support of a scale within the measuring range is achieved by this embodiment it is difficult to obtain a stress-free contact force that is homogeneous over the entire measurement graduation level.

OBJECTS AND SUMMARY OF THE INVENTION

It is an object of the present invention to recite an arrangement of a scale fastened to a support, wherein the scale is held stably and free of drift on the support. Furthermore, the fastening of the scale should be as simple as possible and should be done in a cost-effective manner.

This object is attained by an arrangement for a scale, the arrangement including a scale having a measurement graduation that defines a measurement range and a support arranged opposite to the measurement graduation. The arrangement further includes spheres two-dimensionally distributed on the support, wherein the spheres are immovably fixed on the support and to the scale.

Accordingly, the scale has a measuring graduation and is supported by spheres, which are two-dimensionally distributed/arranged on the support. On a surface of the scale, the measuring graduation defines a measuring range, and the surface of the scale located opposite the measuring graduation constitutes a support face that contacts the spheres. The holding force between the support and the scale is provided so that the spheres are, on the one hand, immovably fastened on the support, and, on the other hand, the spheres are immovably fastened on the scale. These fastenings, respectively fixed in place, are realized by a material-to-material contact.

Means, in particular an adhesive, providing a material-to-material fastening is used for immovable fastening the spheres in place to the scale and to the support. The adhesive is preferably embodied in the form of a coating, for which there are several options. A first layer in which the spheres are fixed in place on the support can be applied to the support. Alternatively, the first layer can be applied to the spheres in the form of a coating. And a second layer in which the spheres are fixed in place on the scale can be applied to the scale. In the alternative or additionally, a third layer can be applied to the spheres in the form of a coating. In the mounted state, the spheres penetrate these two layers, so that a direct contact of the spheres with the bearing area of the scale and the support exists without the interposition of layer material.

Particularly advantageous is the use of an adhesive, in particular a glue which shrinks when hardening. The shrinking effect of the glue is used positively in that an adhesive force is generated that acts as a tension spring by which the contact face of the scale is pulled against the spheres.

It is particularly advantageous if the spheres are spaced from each other at a mutual mean distance as measured from center to center of the spheres that is less than the thickness of the scale.

The spheres and the holding structure, which are means providing the material-to-material fastening, are arranged and designed in such a way that free spaces are formed between them, wherein the free spaces constitute outward leading channels. These channels extending in the space between the scale and the support are in correspondence with the surrounding medium.

To avoid distortions, it is particularly advantageous if the materials of the support and the scale each have the same thermal expansion coefficient. The expansion coefficient of the support and the scale preferably is less than $0.1 \times 10^{-6} K^{-1}$.

The spheres include of a material which resists the occurring pressure forces without deformation, if possible. A suitable material is glass, for example The flatness of the surface—even of a scale of a large surface area—is retained by the arrangement in accordance with the present invention, i.e., is not disturbed, since interfering media can be deposited in the free areas formed between the spheres. Short-periodic longitudinal errors in the measurement graduation plane are avoided, and a high measurement accuracy is assured.

During measuring operations the scale is securely fastened on the support, which means that there is a high degree of stiffness in the measuring direction as well as perpendicularly to the plane of the measuring graduation.

Exemplary embodiments of the present invention will be explained in greater detail by means of the drawings.

Shown are in:

DETAILED DESCRIPTION OF THE PREFERRED EMBODIMENTS

Figure 1:
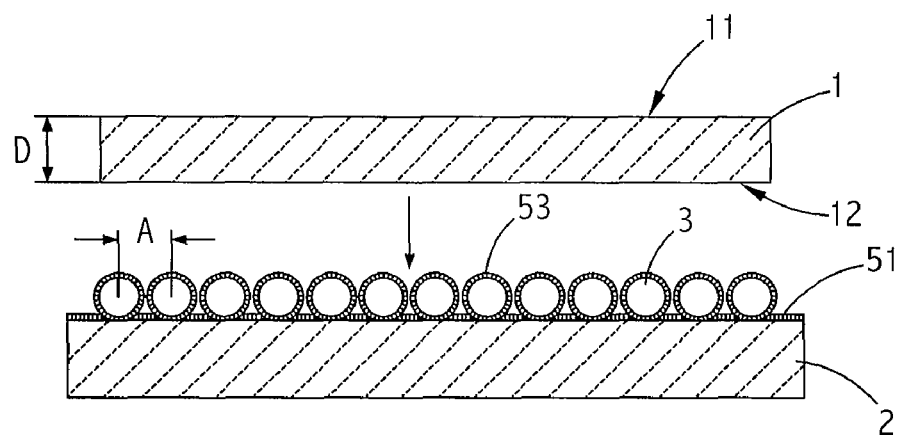
FIG. 1 shows a side, cross-sectional view of a first embodiment of a support with spheres in the process of a scale being placed in accordance with the present invention.
Figure 2:
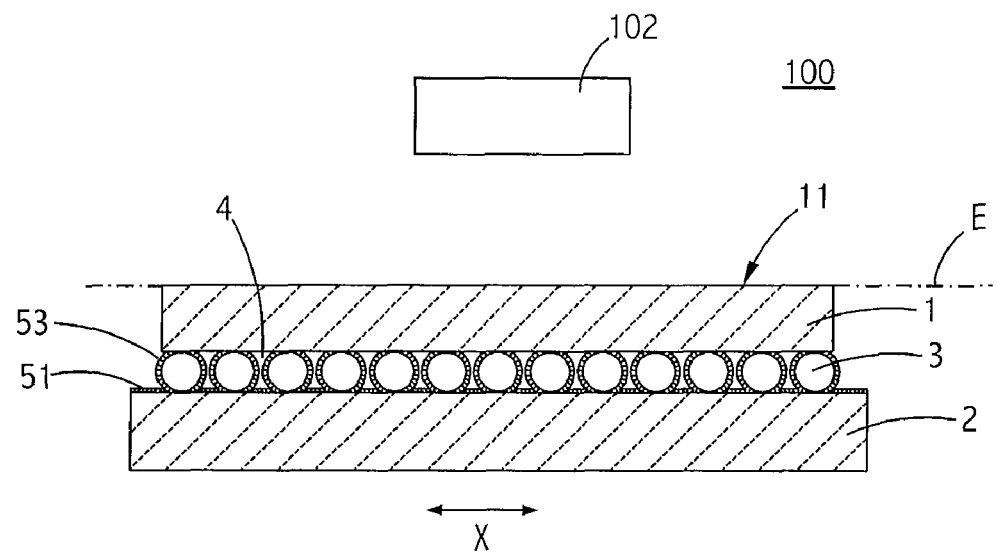
FIG. 2 shows a side, cross-sectional view of the scale held on the support of FIG. 1 is accordance with the present invention.
Figure 3:
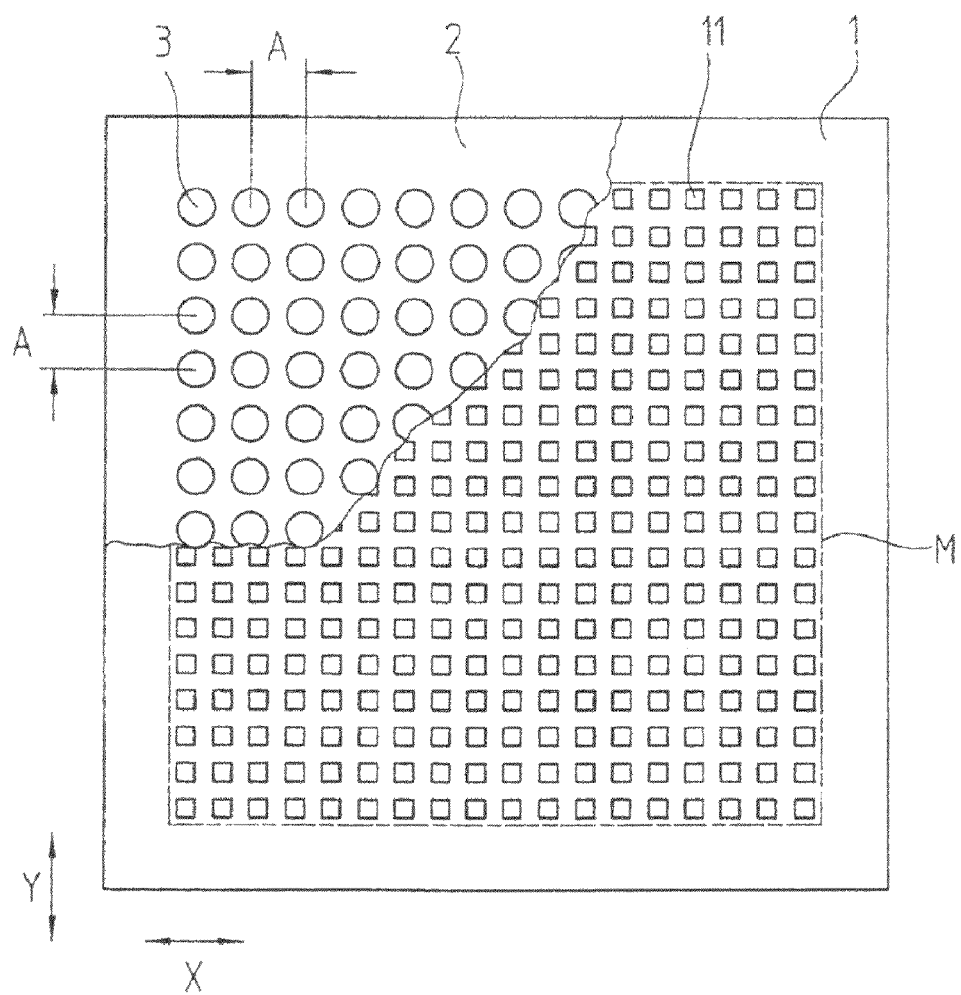
FIG. 3 shows a top view of the arrangement of FIG. 2.

A first exemplary embodiment of the present invention will be explained by FIGS. 1-3. In particular, FIGS. 1-3 show a position measurement system 100 that includes a scale 1, support 2, a holding structure and a scanning unit 102. As shown in FIGS. 1-3, a scale 1 has a measuring graduation 11, wherein the scale 1 is made of glass or ceramic glass (e.g. ZERODUR). The measuring graduation 11 is an incremental graduation which, during position measuring, is photo-electrically scanned in two measuring directions X and Y by a scanning unit 102 (see FIG. 2) for generating position-dependent scanning signals. The measuring graduation 11 can be a reflecting amplitude grating or a phase grating which, in a known manner, is used for highly accurate interferential position measurements. During this position measurement, the scale 1 is held on a support 2. This support 2 preferably is made of a material having the same expansion coefficient as the scale 1. The mean thermal expansion coefficient $\alpha$ in a temperature range between 0° to 50° of the scale 1 and the support 2 is preferably less than $0.1 \times 10^{-6} K^{-1}$ when using glass of a so-called zero expansion, such as ZERODUR, SITAL and ULE, and less than $1.5 \times 10^{-6} K^{-1}$ when using metals, such as INVAR, for example.

On the surface 12 of the scale 1 facing the support 2, the scale 1 is supported by spheres 3. These spheres 3 are arranged, two-dimensionally spatially distributed, either geometrically distributed in a regular grid, or statistically distributed. The spheres 3 are space from each other at a mutual mean distance A as measured between the centers of the spheres, wherein A is less than the thickness D of the scale 1. In particular, the spheres 3 are arranged at a mutual mean distance A of less than 1/10th of the thickness D of the scale 1. This condition is met at every location of the two-dimensional distribution of the spheres 3, but at least within the measuring range M. The measuring range M is defined by the range of the measuring graduation 11 which is used for highly accurate position measurement. The thickness D of the scale 1 is the distance between the measuring graduation plane E shown in FIG. 2, in which the measuring graduation 11 is located, and the support surface 12, by which it is supported on the spheres 3.

It is assured by this measure that most or all tensile and compression stresses which are caused by fastening are highly frequent spatially in such a way that such stresses diminish over the thickness D of the scale 1 and do not result in longitudinal errors in the measuring graduation plane E. By the support being directly opposite the measuring graduation 11, the scale 1 is stably fastened on the support 2, which means a high degree of stiffness is generated in the measuring directions X and Y, as well as vertically relative to the measuring graduation plane E.

The two-dimensional measuring graduation 11 of the scale 1 is represented in a top view in FIG. 3. In order to be able to better represent the two-dimensionally distributed arrangement of the spheres 3 between the scale 1 and the support 2, the scale 1 has been omitted in the upper left portion of the representation of FIG. 3.

The two-dimensional spatial representation of the spheres 3, shown in a top view in FIG. 3, takes place in that free spaces 4 are created between the spheres 3 that are in connection with each other and thus form outward-leading channels. Because of this, it is possible to vent the air homogeneously over the entire surface of the scale 1 through the channels to the environment, which assures good evenness of the scale 1.

Typical values of the thickness D of the scale 1 lie between 0.5 mm and 15 mm.

The spheres 3 are made of a material which resists occurring pressure forces as much as possible without deformation. For example, a suitable material for the spheres 3 is glass. In an advantageous manner, the spheres 3 are made of a material that has the same coefficient of expansion as the scale 1.

In particular, the spheres 3 have a diameter between 20 µm and 200 µm, typically 50 µm. The tolerance of the spheres with regard to diameter and roundness preferably is less than 5 µm, i.e., with a nominal diameter of 50 µm, the spheres 3 have a deviation of maximally ±5 µm.

In connection with all exemplary embodiments, actual fastening of the scale 1 on the support 2 is performed by the immovable fastening of the spheres 3 to the sides of the support 2 and the scale 1 that face each other. These fastenings are material-to-material connections, i.e., by gluing, soldering or welding, for example.

In connection with the first exemplary embodiment, a holding structure in the form of a layer 51 applied to the support 2, into which the spheres 3 have been embedded and are in this way bound in a locally stable manner to the support 2, are used for the drift-free holding of the spheres 3 on the scale 1 and the support 2. This layer 51 is an adhesive, for example a solidly hardening glue, a photo-sensitive resist, or a polymer, and has a thickness which is a fraction of the diameter of the spheres 3.

The positional fixation of the scale 1 with respect to the spheres 3, now positionally fixed in place on the support 2, also takes place by a holding structure in the form of an adhesive layer 53, for example in the form of glue or another solidly hardening material, which encloses the spheres 3 and acts adhesively.

On the one hand, the spheres 3 contact the scale 1 on its underside, i.e., the support surface 12, in a spot-like manner, and on the other hand, the spheres contact the support 2, also in a spot-like manner. By this it is assured that the level surface of the scale 1 is not negatively affected by other media, for example the adhesive. The layers 51, 53 only have the purpose of fixing the spheres 3 in place and of generating and maintaining the hold between the support 2 and the scale 1.

It is assured by the spherical shape and a suitable choice of the thickness of the layers 51 and 53 that free spaces 4 are created between respectively two spheres 3, even if these touch each other. The material of the layers 51, 53 has a sufficient volume for hardening and also for subsequent aging without affecting the distance between the support 2 and the scale 1.

With the two-dimensional arrangement of the spheres 3, these free spaces 4 are in connection with each other and thus constitute outward-leading channels. Because of this, it is possible to homogeneously exhaust air over the entire surface of the scale 1 through the channels outward to the environment, which assures good level seating of the scale 1 in the course of mounting it, and also during measuring operations.

These free spaces 4, which are connected with each other, have the advantage that in the course of placing the scale 1 on the spheres 3 air in the spaces between can escape free of constraining forces. Moreover, there is the possibility of using the free spaces 4 as conduits for vacuum-aspiration of the scale 1. To this end, the scale 1 is placed on top of the spheres 3, and a holding force is introduced by creating an underpressure in the free spaces 4 until the layer material has completely hardened. The free spaces 4 leading to the exterior can also be used for example, for rinsing the spaces between the spheres 4 with a material in order to actively affect the layer material, or for temperature regulation. In place of an underpressure, it is also possible to apply overpressure, or a medium which dissolves the layer material can also be introduced in order to make the removal of the scale 1 possible.

The above remarks regarding the support 2, the scale 1 and the measuring graduation 11 also apply to the exemplary embodiments which follow. Therefore the same reference numerals are used in all exemplary embodiments.

Figure 4:
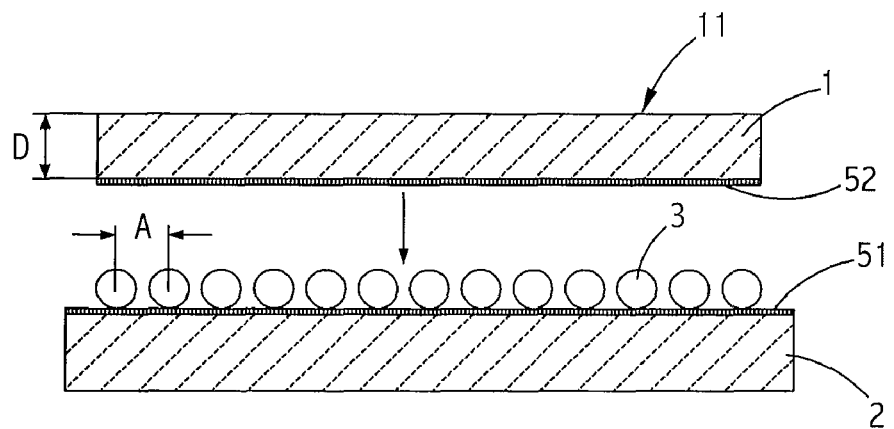
FIG. 4 shows a side, cross-sectional view of a second embodiment of a support with spheres in the process of a scale being placed in accordance with the present invention.
Figure 5:
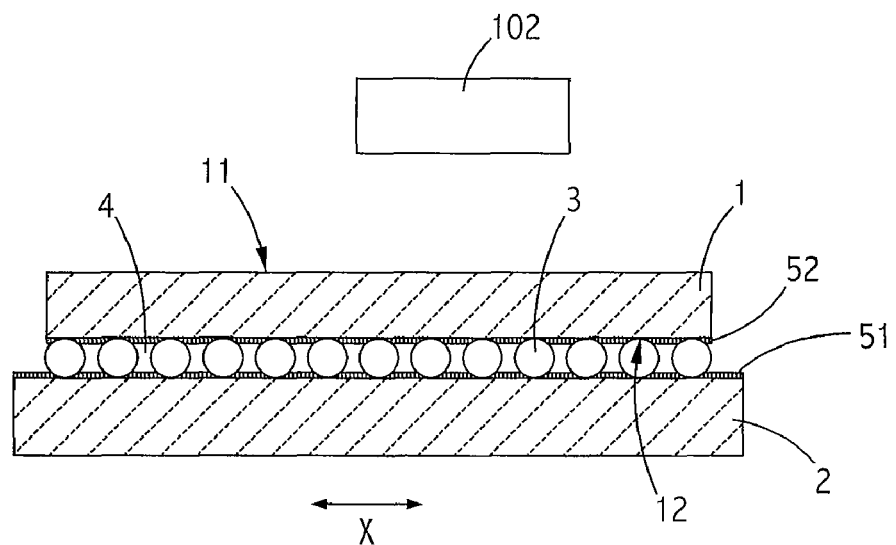
FIG. 5 shows a side, cross-sectional view of the scale held on the support of FIG. 4 is accordance with the present invention.

The second exemplary embodiment represented in FIGS. 4 and 5 differs from the first exemplary embodiment only in that, for the seating, fixed in place, of the spheres 3, a holding structure in the form of a layer 52 has been applied to the support surface 12 of the scale 1.

Here, the spheres 3 also respectively contact the scale 1 on its support surface 12 in point-like manner and therefore penetrate through the layer 52 when being placed on it. By this it is assured that the level surface of the scale 1 is not negatively affected by other media, in particular the layer material. The layers 51, 52 have the sole purpose of fixing the spheres 3 in place and of generating the holding force between the support 2 and the scale 1 and to maintain it.

Figure 6:
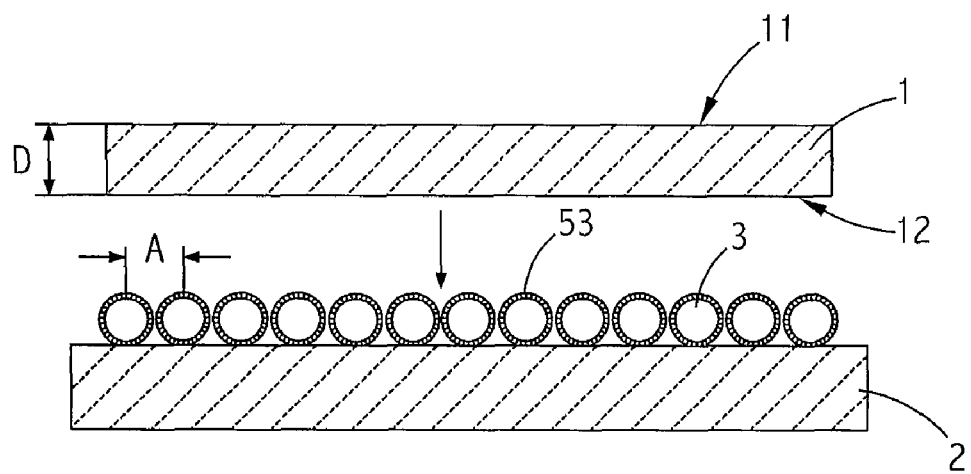
FIG. 6 shows a side, cross-sectional view of a third embodiment of a support with spheres in the process of a scale being placed in accordance with the present invention.
Figure 7:
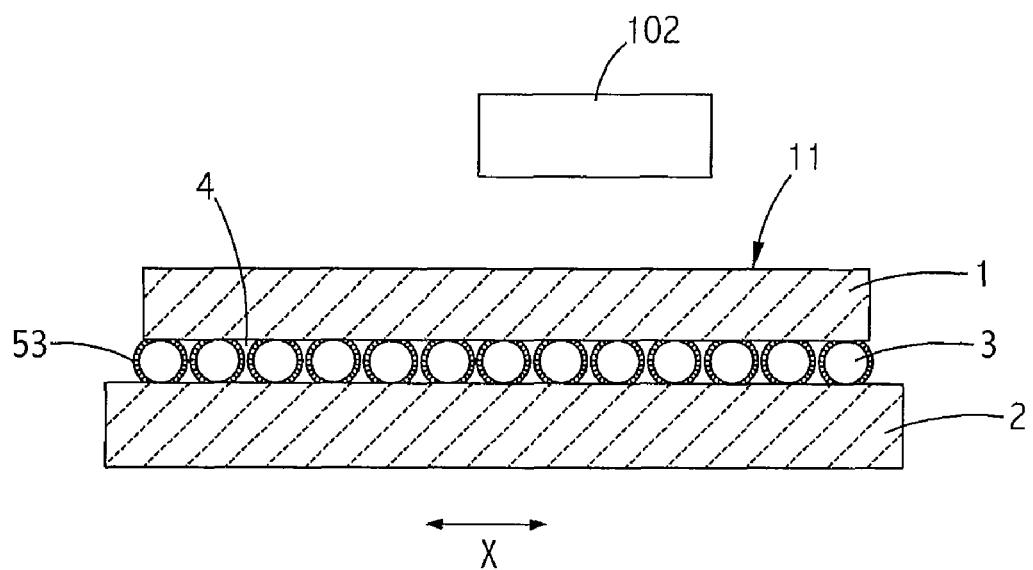
FIG. 7 shows a side, cross-sectional view of the scale held on the support of FIG. 6 is accordance with the present invention.

The difference between the third exemplary embodiment represented in FIGS. 6 and 7 and the first exemplary embodiment lies in that only the layer 53, which functions as the sheathing of the spheres 3, functions as the holding structure for the fixation in place of the spheres 3 on the support 2, as well as for the fixation in place of the spheres 3 on the scale 1. This sheathing can be realized by admixing a holding structure, for example an adhesive or photoresist, with the spheres 3, so that the spheres 3 are distributed in it and this mixture is applied to the support 2.

For the improved handling and distribution of the spheres 3 on the support 2, the spheres can also be fixed in place on a support, for example in the form of a foil, in which case this foil, prefabricated in this manner, is then applied to the support 2 and/or the scale 1.

In connection with all exemplary embodiments, the fixation in place between the spheres 3 and the support 2, as well as between the spheres 3 and the scale 1, can be realized by adhesives in the form of glue, of photo-sensitive resist, of soldering material (for example glass solder), of sinter layers, or by cold-bonding.

In place of, or in addition to, the incremental measurement graduation, it is also possible to provide an absolute coding.

The foregoing description is provided to illustrate the present invention, and is not to be construed as a limitation. Numerous additions, substitutions and other changes can be made to the present invention without departing from its scope as set forth in the appended claims.

We claim:
1. An arrangement for a scale, the arrangement comprising:
a scale comprising a measurement graduation that defines a measurement range;
a support arranged opposite to said measurement graduation; and
spheres arranged two-dimensionally distributed on said support, wherein said spheres are immovably fixed on said support and to said scale.

2. The arrangement in accordance with claim 1, further comprising a holding structure that immovably retains said spheres on said support and to said scale, wherein said holding structure cause a material-to-material connection between said spheres and both said support and said scale.

3. The arrangement in accordance with claim 2, wherein said holding structure comprises:
a first layer arranged on said support; and
a second layer arranged on said scale, wherein said spheres are embedded in said first layer and said second layer.

4. The arrangement in accordance with claim 2, wherein said holding structure comprises a layer in which said spheres are embedded.

5. The arrangement in accordance with claim 1, wherein said spheres are arranged at a mutual distance as measured from their centers, wherein said mutual distance is less than a thickness of said scale.

6. The arrangement in accordance with claim 1, wherein said spheres are arranged and fastened in such a way that said spheres define free spaces between each other, which constitute outward-leading channels.

7. The arrangement in accordance with claim 1, wherein said support and said scale have identical thermal coefficients of expansion.

8. The arrangement in accordance with claim 7, wherein said thermal coefficients of expansion of said support and said scale have a value that is less than $1.5 \times 10^{-6} K^{-1}$.

9. The arrangement in accordance with claim 7, wherein said thermal coefficients of expansion of said support and said scale have a value that is less than $0.1 \times 10^{-6} K^{-1}$.

10. A position measurement system, comprising:
an arrangement for a scale, the arrangement comprising:
a scale comprising a measurement graduation that defines a measurement range;
a support arranged opposite to said measurement graduation; and
spheres arranged two-dimensionally distributed on said support, wherein said spheres are immovably fixed on said support and to said scale; and
a scanning unit that scans said measurement graduation and generates position-dependent signals, wherein said scanning unit and arrangement move relative to one another in a scanning direction.

11. The position measuring system of claim 10, wherein said measuring graduation is an incremental graduation.

12. The position measuring system of claim 10, wherein said scanning unit photo-electrically scans said measuring graduation.

13. The position measuring system of claim 10, further comprising a holding structure that immovably retains said spheres on said support and to said scale, wherein said holding structure cause a material-to-material connection between said spheres and both said support and said scale.

14. The position measuring system of claim 13, wherein said holding structure comprises:
a first layer arranged on said support; and
a second layer arranged on said scale, wherein said spheres are embedded in said first layer and said second layer.

15. The position measuring system of 13, wherein said holding structure comprises a layer in which said spheres are embedded.

16. The position measuring system of claim 10, wherein said spheres are arranged at a mutual distance as measured from their centers, wherein said mutual distance is less than a thickness of said scale.

17. The position measuring system of claim 10, wherein said spheres are arranged and fastened in such a way that said spheres define free spaces between each other, which constitute outward-leading channels.

18. The position measuring system of claim 10, wherein said support and said scale have identical thermal coefficients of expansion.

* * * * *